United States Patent [19]

Yongue

[11] 3,725,577

[45] Apr. 3, 1973

[54] COMMON BASE AMPLIFIER TERMINATING CIRCUIT FOR HIGH IMPEDANCE DETECTING APPARATUS

[75] Inventor: James M. Yongue, Indianapolis, Ind.

[73] Assignee: RCA Corporation

[22] Filed: Nov. 6, 1970

[21] Appl. No.: 87,475

Related U.S. Application Data

[62] Division of Ser. No. 641,759, May 29, 1967.

[52] U.S. Cl. ....................178/7.3 R, 178/5.4 AC

[51] Int. Cl. ....................H04n 5/52

[58] Field of Search .178/7.3 R, 5.4 AC, 7.5, 7.3 DC; 330/24, 26, 485, 85, 25; 325/319, 412

[56] References Cited

UNITED STATES PATENTS

| | | | |
|---|---|---|---|
| 2,878,312 | 3/1959 | Goodrich | 178/7.5 |
| 2,977,411 | 3/1961 | Goodrich | 178/7.3 DC |

*Primary Examiner*—Richard Murray
*Attorney*—Eugene M. Whitacre

[57] ABSTRACT

A closed loop automatic chroma control circuit for a color television receiver is disclosed in which the grid leak current of an injection locked color reference oscillator is supplied to a transistor so as to produce an amplified A.C.C. voltage.

2 Claims, 1 Drawing Figure

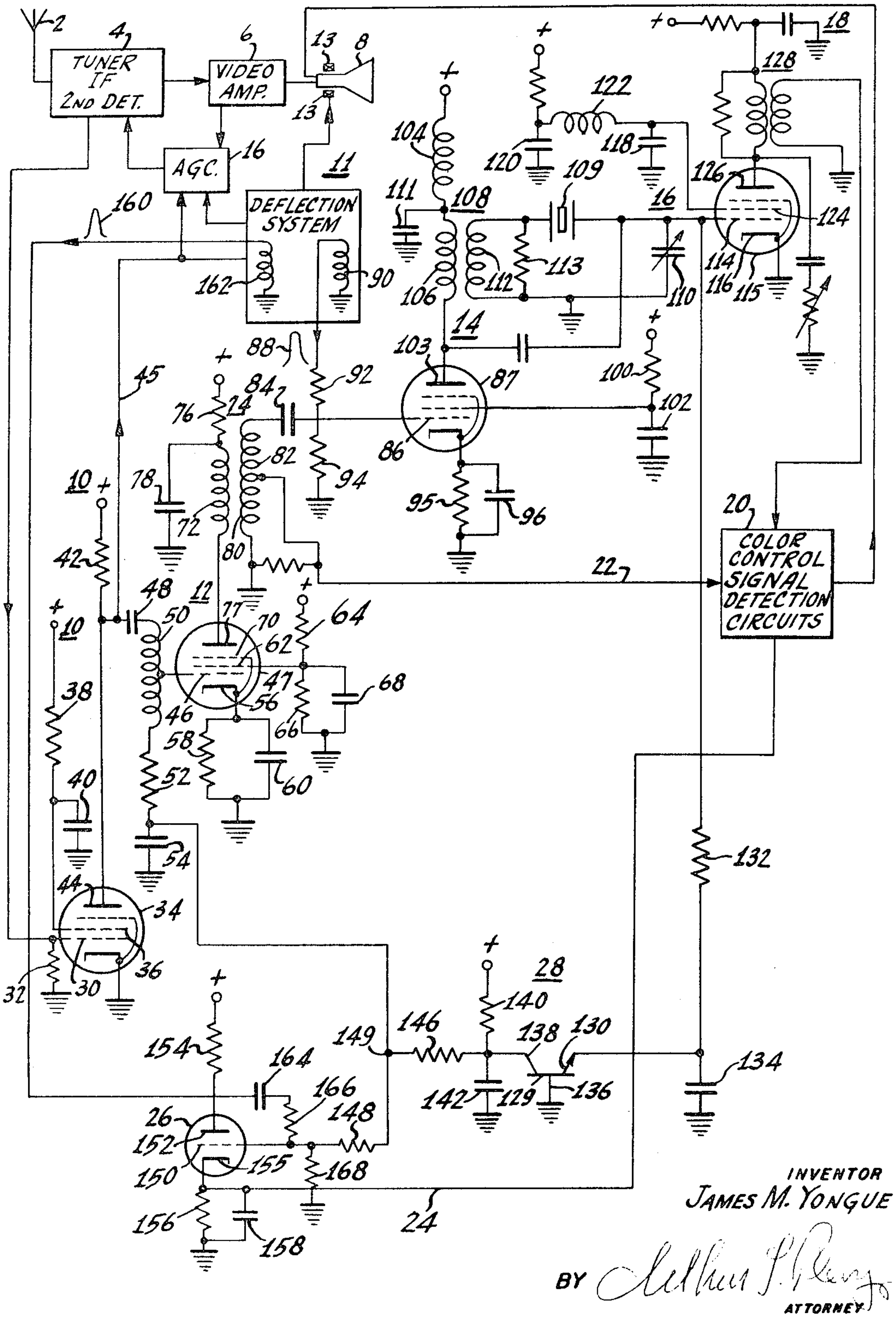
INVENTOR
JAMES M. YONGUE
BY [signature]
ATTORNEY

COMMON BASE AMPLIFIER TERMINATING CIRCUIT FOR HIGH IMPEDANCE DETECTING APPARATUS

This is a division of application Ser. No. 641,759, filed on May 29, 1967.

This invention relates to improvements in automatic chroma control circuits (A.C.C.) circuits that are used to maintain the level of the chrominance signals in a color television receiver.

In receivers designed for operation in the color television system approved by the Federal Communications Commission of the United States of America, the A.C.C. circuit derives a D.C. voltage that is proportional to the amplitude of the color synchronizing bursts, which include several cycles of a color subcarrier, and applies the D.C. voltage to a chrominance signal amplifier so as to vary its gain inversely with the amplitude of the bursts. In a closed loop A.C.C. circuit, the D.C. voltage is derived from bursts that have been amplified by the chrominance amplifier. In this type of A.C.C. circuit the operation is improved by amplifying the D.C. voltage.

A D.C. voltage that increases in a negative direction with an increase in the amplitude of the bursts may be derived at the grid of an injection locked oscillator, as indicated in the U. S. Pat. No. 2,982,812, issued on May 2, 1961, and assigned to the same assignee as this application. This D.C. voltage has the correct polarity for application to the gain control electrodes of most chrominance signal amplifiers, but it does not have sufficient amplitude to produce high quality operation in a closed loop A.C.C. system. In order to preserve the polarity, an even number of D.C. amplifiers would ordinarily be required.

It is an object of this invention to provide a single stage D.C. amplifier in a closed loop A.C.C. system that operates to supply the required gain without inverting the polarity of the D.C. voltage being amplified.

In order to prevent the impedance associated with the input of a direct current amplifier from interfering with the operation of the oscillator, it can be coupled to the grid of the oscillator by a voltage divider, but this reduces the effective gain and thereby reduces the D.C. voltage that can be provided to the gain control electrode of the chrominance amplifier.

Accordingly, it is another object of this invention to provide a direct current amplifier that is coupled to the grid of the oscillator in such manner that no gain is lost and that the input impedance of the amplifier has little or no effect on the operation of the oscillator.

These objects are attained in accordance with this invention by connecting a current responsive D.C. amplifier, such as a transistor, in the grid leak path of the oscillator e.g. the emitter electrode can be connected to the end of the grid leak resistor that is remote from the grid, the base electrode can be connected to ground and the amplified D.C. voltage produced across a load resistor in the collector circuit can be translated to a suitable range for application to the grid of a chrominance amplifier.

The features of this invention which are presently believed to be novel are set forth with particularity in the appended claims. The invention, both as to its organization and manner of operation, may best be understood by reference to the following description, taken in connection with the accompanying drawing, in which the single FIGURE illustrates certain portions of a color television receiver in block diagram form and the portions which are related to this invention in schematic form.

The general organization of the various components of the receiver is as follows. An antenna 2 intercepts transmitted signals and applies them to a tuner, I.F. amplifier and second detector, all contained within the rectangle 4. Detected signals are amplified in a video amplifier 6 and are applied to a cathode ray tube 8 so as to control the brightness of the pictures produced thereby. They are also applied via a driver amplifier 10 to synchronize a deflection system 11 that generates deflection currents for the windings 13 that cause the electron beam of the cathode ray tube 8 to scan a raster. An output of the driver amplifier 10 and keying pulses from the deflection system 11 are applied to an A.G.C. circuit 16 so as to produce a voltage that controls the gain of the tuner and/or I.F. amplifier in the rectangle 4 in such manner as to maintain the low frequency components of the video signal at the input of the video amplifier 6 at a desired level.

In the chrominance channel, the chrominance signals and color synchronizing bursts appearing at the output of the amplifier 10 are selectively amplified by a chrominance amplifier 12, the gain of which is to be controlled in accordance with this invention. Separation of the bursts from the output of the chrominance amplifier 12 is effected by a burst separating means shown as a burst gate amplifier 14 that is keyed to pass signals only when the bursts are present. The color subcarrier frequency of the bursts is selected by a sharply tuned crystal filter 16 and applied to a color reference oscillator 18 so as to synchronize its phase and frequency. The output of the oscillator 18 is applied to color signal detection circuits 20 where it is combined with chrominance signals, coupled from the output of the chrominance amplifier 12 via a lead 22, to produce signals which are applied so as to control the color of the pictures produced by the cathode ray tube 8. Color synchronizing bursts are prevented from interfering with the operation of the color signal detection circuits by pulses supplied to it via a lead 24 from a keyed burst blanking triode 26. The triode 26 also aids in translating the D.C. level of the A.C.C. potential provided by a circuit 28 of this invention to control the gain of the chrominance amplifier 12.

In particular, the details of the amplifier 10 are as follows. It includes a pentode tube 34 having a control grid 30 coupled to the output of the second detector in the rectangle 4. A grid leak resistor 32 is connected between ground and the grid 30, and the cathode is connected to ground. The screen grid 36 is provided with operating potential by a screen resistor 38 and bypass capacitor 40. Amplified video signals are produced across an anode resistor 42 that is connected between the anode 44 and a point of positive operating potential. These video signals are applied via a lead 45 to the A.G.C. system 16 and the deflection system 11.

Chrominance signals and the color synchronizing bursts are separated from the rest of the amplified video signals appearing at the anode 44 and applied to a control grid 46 of the pentode 47 of the chrominance amplifier 12 by a series resonant circuit to signal ground comprised of a D.C. tuning capacitor 48, an inductor 50, a Q spoiling resistor 52 and a bypass capacitor 54. The cathode 56 of the pentode 47 is biased by a parallel resistor 58 and capacitor 60. Operating potential for the screen grid 62 is supplied from a point of positive voltage via a voltage divider formed by resistors 64 and 66. Suitable bypass of signal frequencies is provided by a capacitor 68, and the suppressor grid 70 is internally connected to the cathode 56. Amplified chrominance signals and color synchronizing bursts are produced across a primary winding 72 of a bandpass output transformer 74 by connecting the winding in series with a voltage dropping resistor 76 between the anode 77 and a point of positive D.C. potential. Suitable signal bypass is provided by a capacitor 78. Chrominance signals and bursts across a lower portion 80 of the secondary winding of the transformer 74 are coupled via a lead 22 to the color control signal detection system 20. Both the primary winding 72 and the secondary winding 80, 82 are tuned to resonance at the color subcarrier frequency by capacitance not shown.

The chrominance signals and bursts across the entire secondary winding are coupled by a capacitor 84 to a control grid 86 of a pentode 87 of the burst gate amplifier 14. The pentode 87 is rendered conductive when the bursts are present by coupling positive pulses 88 from an auxiliary winding 90 on the line deflection transformer, not shown, to the grid 86 via a voltage divider comprised of a resistor 92 and the grid leak resistor 94. Between bursts, when the chrominance signals are present at the grid 86, the pentode 87 is rendered non-conductive by reason of the positive voltage stored by the long RC time constant of the parallel cathode resistor 95 and capacitor 96. Suitable positive potential for the screen is supplied by resistor 100 and a bypass capacitor 102. Positive operating potential for the anode 103 is supplied via a choke coil 104 and a primary winding 106 of an output transformer 108, a signal ground being supplied by a capacitor 111.

Selection of the color subcarrier frequency from the amplified color synchronizing bursts appearing across the primary winding 106 is accomplished by the filter 16, which is comprised of a crystal 109 and a variable capacitor 110 connected in series across the secondary winding 112 of the transformer 108. The junction of the winding 112 and the capacitor 110 is connected to ground. The value of impedance coupled into this circuit via the primary winding 106 is reduced by making the numbers of turns in the secondary winding 112 small in comparison with the number of turns in the primary winding 106, and the effective inductance of the secondary winding 112 is reduced by connection of a resistor 113, which has a low value, in shunt with the secondary winding 112. The crystal 109 is ground so that it has an inductive reactance at the frequency of the color subcarrier and the capacitor 110 is adjusted so that the circuit 112, 109, 110 and 113 is resonant at the subcarrier frequency. The Q of this circuit is sufficiently high to practically eliminate the flow of currents of other frequencies during the periods when the bursts are present. The voltage wave of color subcarrier frequency that is produced across the capacitor 110 is applied to a control grid 114 of a pentode amplifier 115 of the oscillator 18 so as to synchronize its phase and frequency.

In the oscillator 18, the cathode 116 is connected to ground and a circuit, resonant at the approximate frequency of the color subcarrier and comprised of a tuning capacitor 118, a bypass capacitor 120 and inductor 122 is connected between the grid 124 and ground. It will be noted that the crystal 109 and capacitor 110 are effectively in parallel between the control grid 114 and ground so that the control grid 114, cathode 116 and screen grid 124 operate like a tuned-plate tuned-grid oscillator. The strength of the oscillations can be adjusted by varying the inductance of the inductor 122, and they are electron coupled to the anode 126. An output transformer 128 couples the oscillations to the color signal detection circuits 20.

The oscillator 18 operates as follows to provide a control voltage that varies with the amplitude of the bursts. Whether or not color synchronizing bursts are present in the video signals, the oscillator 18 continues to operate at the frequency of the color subcarrier. In the absence of the bursts, the oscillator action produces an alternating current voltage at the grid 114 which is clamped by the grid 114 and the cathode 116 so as to produce a negative D.C. voltage component at the grid 114. The magnitude of the alternating current wave at the grid 114, and hence the magnitude of the D.C. voltage component, can be adjusted within limits by changing the inductance of the inductor 122. When the bursts are present, and when their fundamental frequency is added in phase with the alternating current wave produced at the grid 114 by the oscillator action, the D.C. voltage component produced thereat is increased negatively in proportion to the amplitude of the fundamental frequency of the bursts and hence in proportion to the amplitude of the bursts. The D.C. voltage component produces a corresponding direct current in the grid leak path to be discussed. The burst gate amplifier 14, filter 16, grid 114 and the cathode 116 thus constitute means coupled to the output of the chrominance amplifier 12 for producing a direct current control voltage that varies in value in accordance with the amplitude variations of the bursts.

The A.C.C. circuit 28 of this invention is comprised of a current responsive amplifier such as transistor 129 having its emitter 130 connected via a grid leak resistor 132 to the grid 114 of the oscillator pentode 115. A capacitor 134 is connected between the emitter 130 and ground for purposes of removing the color subcarrier frequency from the emitter 130. A ground connection is made to the base electrode 136 of the transistor 129, and the collector 138 is connected by a load resistor 140 to a point of positive potential. Due to the fact that color synchronizing bursts are not transmitted during the field or vertical blanking periods, the alternating current wave supplied from the capacitor 110 to the grid 114 of the pentode 115 decays in amplitude during these periods, thus causing the D.C. voltage component at the grid 114 to be reduced and introducing field frequency components into the current supplied to the emitter 130. A capacitor 142 connected between the collector 138 and ground in combination with the load resistor 140 forms a filter that aids in removing these components from the A.C.C. signal.

In the grid leak path for the grid 114 of the oscillator amplifier 115, a small portion of the grid leak current flows between the emitter 130 and the grounded base 136. Transistor action causes the remainder of the grid leak current to flow through the collector 138, the load resistor 140 and the power supply, not shown, and produce at the collector 138 a voltage that varies in the same sense as the rectified voltage at the grid 114. Both voltages change in a negative direction as the amplitude of the bursts increases. Because the resistance of the load resistor 140 is large, the changes in the D.C. voltage at the collector 138 are much greater than the changes in the D.C. component of the voltage at the grid 114. A distinct advantage of the circuit is that the small impedance of the forward biased base-emitter junction permits the presence of the transistor 128 to have little or no effect on the operation of the oscillator 18.

Although the amplified voltage at the collector 138 varies in the correct direction for A.C.C. purposes, its variations occur within a range that is too positive for direct application to the gain control grid 46 of the chrominance amplifier 12, and, therefore, means are provided for translating it. For this purpose resistors 146 and 148 are connected in series between the collector 138 and a source of negative potential, and the D.C. translated A.C.C. signal is produced at their junction 149. It is applied to the grid 46 by a connection between the junction 149 and the ungrounded side of a filter capacitor 54. The capacitor 54 further reduces signal components of field frequency.

Although other sources of negative voltage for the resistor 148 could be used, the particular one illustrated is the grid 150 of the blanker triode 26. Its anode 152 is connected to a point of positive operating potential by a resistor 154, and its cathode 155 is biased by a parallel resistor 156 and capacitor 158. Positive pulses 160 are derived from the line deflection circuit in the deflection system 12 and are coupled to the grid 150 by a capacitor 164, resistor 166 and grid leak resistor 168. These components serve to clip and clamp the pulse 160 so as to cause the triode 26 to conduct during the time when the color synchronizing bursts are present in the chrominance signals applied via the lead 22 to the color signal detection circuits 20. The conduction of the triode 26 produces positive pulses at the cathode 155 that are coupled via the lead 24 to a point, not shown, in the color signal detection circuit 20 so as to prevent the bursts from being applied to portions of the circuit 20 with which they could interfere. During the crest of the pulses 160, capacitor 164 is charged, and in between pulses it slowly discharges to ground through the resistors 166 and 168 so as to produce a negative voltage at their junction. The bypass capacitor 54 and the resistor 148 form a filter that reduced the amplitude of the pulse voltage at the grid 46. The resistance of the resistors 148 and 146 is large enough in comparison with the resistance of the load resistor 140 as to have little effect on the value of the current at the collector 138.

The circuit described introduces considerable gain in the A.C.C. loop so as to greatly reduce the changes in the level of the chrominance signals supplied by the chrominance pentode 47. This is accomplished with a minimum of additional circuitry and without adversely affecting the operation of the other circuits of the receiver. Although other circuit parameters could be used, the following is a list of those which have been found to provide satisfactory operation.

| | |
|---|---|
| Resistor 132 | 68K ohms |
| Capacitor 134 | 1 μf |
| Transistor 120 | 2N3565 |
| Capacitor 142 | .047 μf |
| Resistor 140 | 3.16M ohms |
| Resistor 146 | 470K ohms |
| Resistor 148 | 4.7M ohms |
| Resistor 168 | 220K ohms |
| Capacitor 54 | 0.1 μf |

What is claimed is:

1. In a television receiver employing a circuit which serves to provide at a signal input terminal thereof a D.C. control potential having a magnitude dependent upon the magnitude of the A.C. signal applied thereto, said circuit providing said potential across a detector impedance having a first end connected to said signal input terminal and a second end, in combination therewith, apparatus for providing an amplified control potential, comprising, a. a common base transistor amplifier circuit including a transistor having an input emitter electrode, an output collector electrode, and a common base electrode, the input impedance at said emitter electrode being smaller than said detector impedance, b. means direct coupling said second end of said detector impedance to said emitter electrode causing a portion of the detected current flowing through said detector impedance due to said control potential to flow through said emitter-to-base current path of said transistor and causing the remainder of said detected current to flow through the emitter-to-collector path of said transistor, said transistor having said emitter-to-base current path poled for easy current conduction in the direction of current flow through said detector impedance, c. resistive load means having an impedance larger than said detector impedance and being coupled to said collector electrode to provide an amplified control potential at said collector electrode and of the same polarity as said control potential, and d. said circuit providing said D.C. control potential including a vacuum tube having a grid and cathode electrode and having a grid-to-cathode diode for rectifying an A.C. signal applied to said grid electrode.

2. Apparatus for developing an amplified control potential from a potential developed across the grid leak resistor of a vacuum tube due to the rectification action of the grid-to-cathode diode of said vacuum tube, comprising, a. a common base transistor amplifier having an input emitter electrode, an output collector electrode, and a common base electrode, the input impedance at said emitter electrode being smaller than that of said grid leak resistor and said base electrode being coupled to a point of reference potential, b. means direct coupling the base-to-emitter path in series with said grid leak resistor to cause a portion of the detected current flowing through said grid leak resistor to flow through said emitter-to-base path of said transistor and the remainder of said detected current to flow through the emitter-to-collector path of said transistor, said transistor having said emitter-to-base current path poled for easy current conduction in the direction of current flow through said resistor, c. resistive load means having an impedance larger than that of said grid leak resistor and being coupled to said collector electrode to provide an amplified control potential thereat and of the same polarity as said control potential.

* * * * *